US011526306B1

(12) United States Patent
La Fratta et al.

(10) Patent No.: US 11,526,306 B1
(45) Date of Patent: Dec. 13, 2022

(54) COMMAND SCHEDULING IN A MEMORY SUBSYSTEM ACCORDING TO A SELECTED SCHEDULING ORDERING

(71) Applicant: Micron Technology, Inc., Boise, ID (US)

(72) Inventors: Patrick A. La Fratta, McKinney, TX (US); Robert M. Walker, Raleigh, NC (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 17/323,628

(22) Filed: May 18, 2021

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ...... G06F 3/0604; G06F 3/061; G06F 3/0614; G06F 3/0653; G06F 3/0659; G06F 3/0673
USPC ....................................................... 711/154
See application file for complete search history.

(56) References Cited

U.S. PATENT DOCUMENTS

| | | | | |
|---|---|---|---|---|
| 8,612,990 | B1* | 12/2013 | Greenfield | G06F 3/0653 709/224 |
| 10,178,638 | B1* | 1/2019 | Stamatakis | G06Q 10/1097 |
| 10,317,982 | B2* | 6/2019 | Borbely-Bartis | G06F 3/0659 |
| 10,852,991 | B1* | 12/2020 | Ciou | G06F 3/0659 |
| 10,884,829 | B1* | 1/2021 | Issa | G06F 12/0207 |
| 11,093,156 | B1* | 8/2021 | Lin | G06F 11/2056 |
| 2008/0168264 | A1* | 7/2008 | Sebastian | G06F 9/4411 713/1 |
| 2016/0231961 | A1* | 8/2016 | Shin | G06F 3/0604 |
| 2019/0227533 | A1* | 7/2019 | Shih | G05B 19/41865 |
| 2020/0117504 | A1* | 4/2020 | Bahl | G06F 9/4881 |
| 2020/0250060 | A1* | 8/2020 | Jin | G11C 11/409 |
| 2021/0294519 | A1* | 9/2021 | Radhapuram | G06F 11/3037 |

OTHER PUBLICATIONS

N. Chatterjee, M. O'Connor, G. H. Loh, N. Jayasena and R. Balasubramonia, "Managing DRAM Latency Divergence in Irregular GPGPU Applications," SC '14: Proceedings of the International Conference for High Performance Computing, Networking, Storage and Analysis, 2014, pp. 128-139 (Year: 2014).*

(Continued)

*Primary Examiner* — Reginald G Bragdon
*Assistant Examiner* — Aaron D Ho
(74) *Attorney, Agent, or Firm* — Nicholson De Vos Webster & Elliott LLP

(57) ABSTRACT

Methods, systems, and apparatus for command scheduling in a memory subsystem according to a selected scheduling ordering are described. Scheduling orderings are determined for a set of commands, where a scheduling ordering identifies an order by which a memory subsystem controller is to issue each command in the set of commands to the memory device. Scores are calculated for the scheduling orderings. A score of the plurality of scores includes a measure of performance of execution of the set of commands according to the scheduling ordering. A scheduling ordering is selected from the scheduling orderings based on the scores, and a command is issued to the memory device according to the scheduling ordering.

20 Claims, 9 Drawing Sheets

(56) References Cited

OTHER PUBLICATIONS

E. Ipek, O. Mutlu, J. F. Martínez and R. Caruana, "Self-Optimizing Memory Controllers: A Reinforcement Learning Approach," 2008 International Symposium on Computer Architecture, 2008, pp. 39-50, doi: 10.1109/ISCA.2008.21. (Year: 2008).*
S. Goossens, K. Chandrasekar, B. Akesson and K. Goossens, "Power/Performance Trade-Offs in Real-Time SDRAM Command Scheduling," in IEEE Transactions on Computers, vol. 65, No. 6, pp. 1882-1895, Jun. 1, 2016, doi: 10.1109/TC.2015.2458859. (Year: 2016).*
S. Goossens, K. Chandrasekar, B. Akesson and K. Goossens. "ILP Formulation and Solution Strategies for Memory Command Scheduling," Eindhoven University of Technology, Oct. 23, 2014, retrieved from <https://www.es.ele.tue.nl/~sgoossens/sdram_trade_offs/esr-2014-03.pdf> (Year: 2014).*
M. Jung, D.M. Mathew, C. Weis, N. Wehn, I. Heinrich, M.V. Natale, and S.O. Krumke. "ConGen: An Application Specific DRAM Memory Controller Generator". In Proceedings of the Second International Symposium on Memory Systems (MEMSYS '16). Association for Computing Machinery, New York, NY, USA, 257-267. (Year: 2016).*
M.V. Natale, M. Jung, K. Kraft, F. Lauer, J. Feldmann, C. Sudarshan, C. Weis, S. Krumke, and N. Wehn. "Efficient Generation of Application Specific Memory Controllers". In The International Symposium on Memory Systems (MEMSYS 2020). Association for Computing Machinery, New York, NY, USA, 233-247. (Year: 2020).*
Mahdi Nazm Bojnordi and Engin Ipek. 2012. PARDIS: a programmable memory controller for the DDRx interfacing standards. SIGARCH Comput. Archit. News 40, 3 (Jun. 2012), 13-24. https://doi.org/10.1145/2366231.2337162 (Year: 2012).*

\* cited by examiner

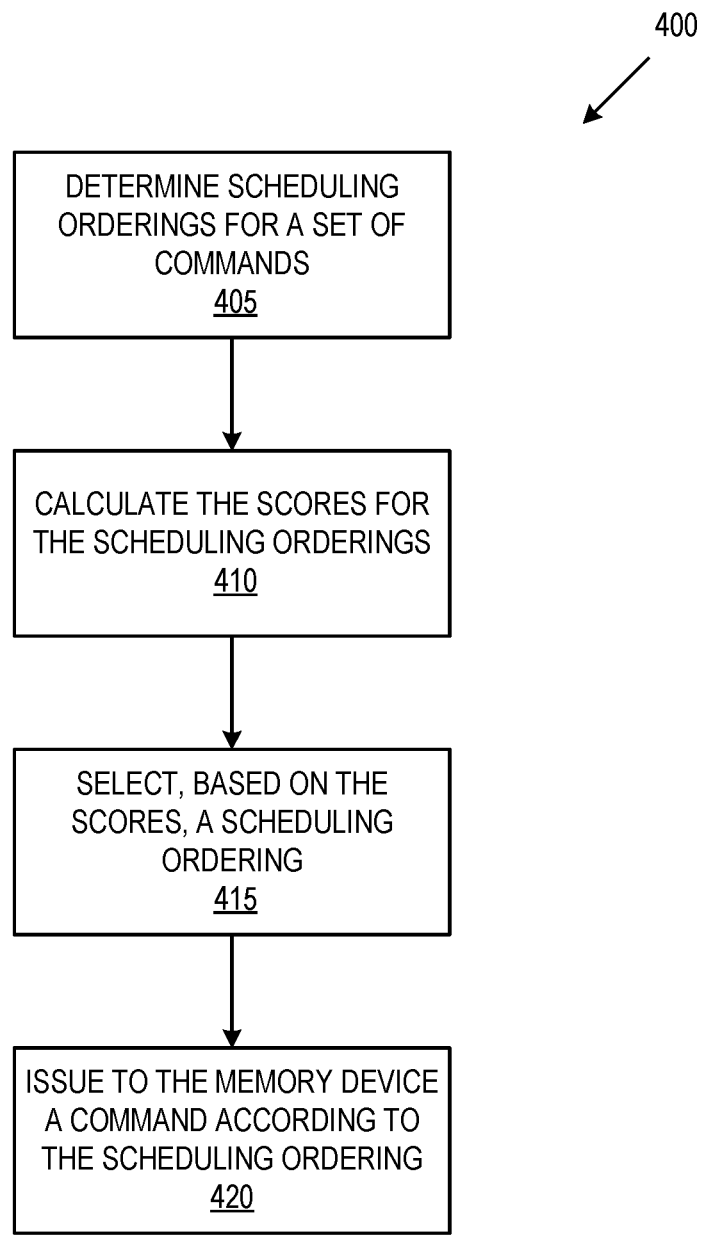

COMMAND SCHEDULING IN A MEMORY SUBSYSTEM ACCORDING TO A SELECTED SCHEDULING ORDERING

TECHNICAL FIELD

The present disclosure generally relates to command scheduling, and more specifically, relates to command scheduling in a memory subsystem according to a selected scheduling ordering.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 is a flow diagram of another example method to schedule commands in a memory subsystem according to a selected scheduling ordering in accordance with some embodiments of the present disclosure.

DETAILED DESCRIPTION

Figure 1:
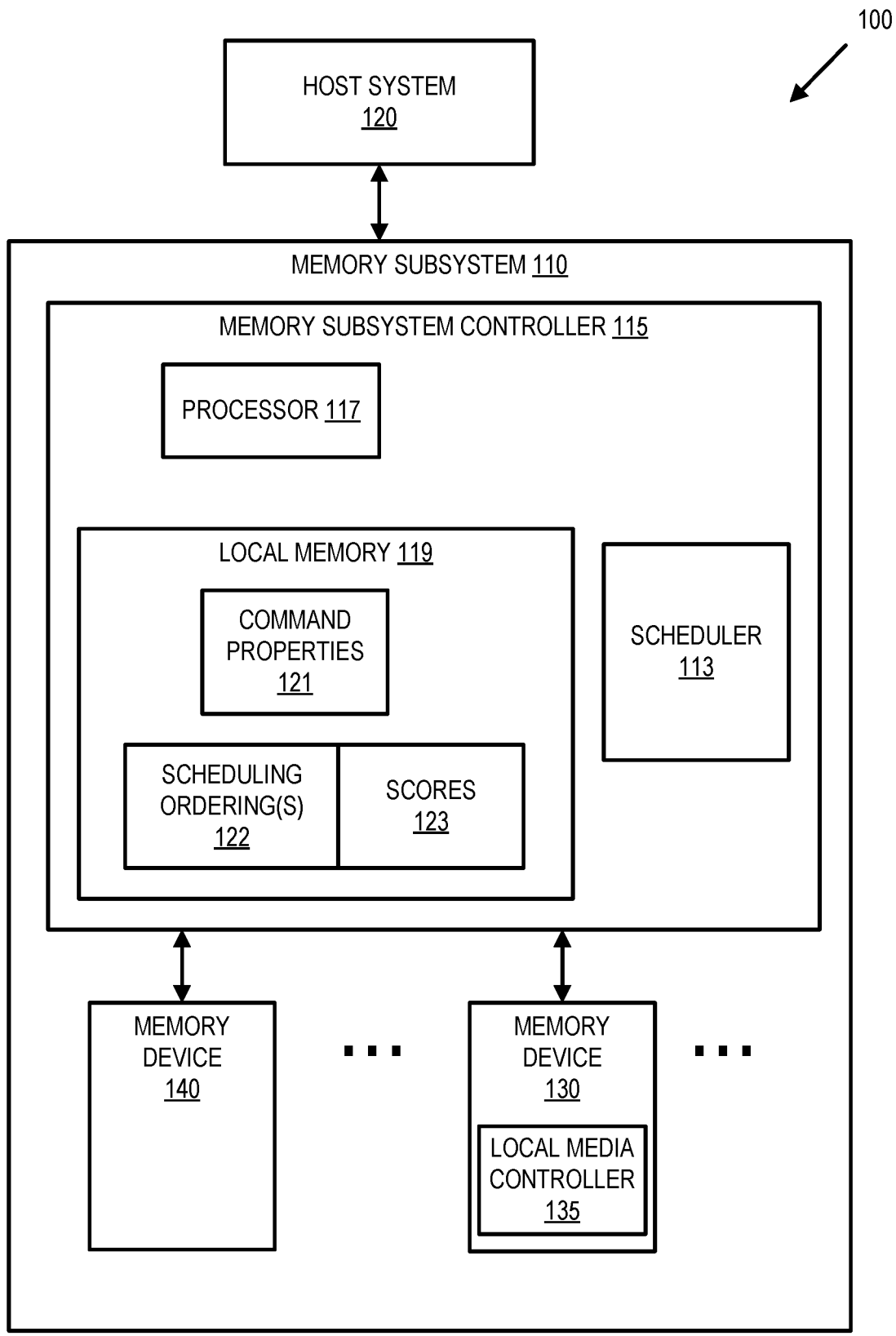
FIG. 1 illustrates an example computing system that includes a memory subsystem in accordance with some embodiments of the present disclosure.

Aspects of the present disclosure are directed to command scheduling according to a selected scheduling ordering in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

A memory subsystem controller receives requests from a host system and issues commands to one or more memory devices to respond to these requests. In some embodiments, the memory subsystem controller adds the commands associated with the requests to a command queue. In some embodiments, the memory subsystem controller can include multiple command queues, and each command queue is associated with a channel A command associated with a request from the host includes an identification of a location in memory where data is to be accessed. In some embodiments, the location can be identified with one or multiple ones of an identifier of a rank, an identifier of a bank, an identifier of a row, and an identifier of a column. The command can be referred to as a column command as it identifies a column (also referred to as Bit Lines) in the memory device. The memory subsystem controller selects a command to issue to a memory device. The selection of a next command to issue is a non-trivial problem, due to various factors. For instance, when the memory subsystem controller chooses a command, this selection may require the activation of a row (also referred to as a word line) in the memory device. In memory subsystems, the activation of the row can block all other commands that access other rows in the same bank. The time needed between a row command to one bank and a row command to another bank, which has implications on the time to service subsequent commands, is an example of a timing constraint that the memory subsystem controller needs to consider when scheduling commands.

The scheduling of the commands can be performed based on simple policies or rules. The simple policies and rules are determined based on heuristics from past behavior of the memory subsystem. For example, the memory subsystem controller can use a FR FCFS (first-ready, first-come, first-serve) scheduling algorithm. FR FCFS prioritizes commands that can be executed immediately (e.g., a read command from a row that is already activated) over commands that cannot (e.g., a command that depends on another command in the command queue, or a read command from a row that is not yet activated, etc.). FR FCFS can achieve good utilization of the bus (i.e., reducing the time the bus remains idle during executions of the commands) between the memory subsystem controller and the memory device(s). However, FR FCFS fails to guarantee an optimal bus utilization. Further, FR FCFS does not consider other performance metrics of the memory subsystem (e.g., read latency, energy consumption, etc.) for scheduling the commands and can have an adverse effect on them. For example, in an attempt to improve bus utilization, a memory subsystem controller operating based on FR FCFS can use a scheduling ordering of the commands that significantly increases the read latency of some of the commands, which can be critical and inacceptable for some applications that use the memory subsystem.

Aspects of the present disclosure address the above and other deficiencies by improving the scheduling of commands in a memory subsystem controller. The scheduling of commands is improved by selecting a scheduling ordering from multiple possible scheduling orderings for a set of commands. In some embodiments, the selection of the scheduling ordering is performed according to one or a combination of performance metrics. The performance metrics can be a read latency metric, a bus bandwidth metric, and/or a power consumption metric. The embodiments described herein enable the memory subsystem to schedule a set of commands according to a scheduling ordering that consistently offers the best performance and improves the performance of the memory subsystem in terms one or more of the performance metrics. In this way, the memory subsystem can make the best possible decision, given the information available to it (e.g., a state of the memory device), of command selection based on that metric. In some embodiments, instead of selecting a next best command to schedule, the memory subsystem selects the best sequence of commands (including more than one command) to be scheduled. This enables the memory subsystem to improve its performance for the duration of the sequence of commands and not for only a single command. In some embodiments, the memory subsystem is operative to calculate scores for a subset of all the possible permutations of scheduling ordering and select the scheduling ordering from this subset instead of calculating the scores for all the possible permutations and performing the selection from the permutations. The selection of the scheduling ordering from the subset instead of the entire set of permutations significantly improves the efficiency of the memory subsystem in selecting a scheduling ordering that improves a performance metric.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM)

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes scheduler 113 that can schedule commands in a memory subsystem according to a selected scheduling ordering. In some embodiments, the controller 115 includes at least a portion of the scheduler 113. For example, the controller 115 can include a processor 117 (processing device) configured to execute instructions stored in local memory 119 for performing the operations described herein. In some embodiments, a scheduler 113 is part of the host system 120, an application, or an operating system.

The memory subsystem controller 115 (also referred to as the controller 115) receives from the host system 120 one or more requests for accessing the memory device(s). The controller 115 is operative to issue a set of commands in response to the request(s). The scheduler 113 is operative to select a scheduling order for the set of commands. The controller 115 issues these commands to a memory device, e.g., memory device 130/140, according to the selected scheduling ordering. Thus, a scheduling ordering identifies an order by which the controller 115 is to issue each command in the sequence of commands to the memory device. The scheduling ordering for a sequence of commands can be different from the order of receipt of their associated requests from the host system 120. In some embodiments, the scheduler 113 is operative to determine multiple scheduling orderings for the set of commands. The scheduler 113 calculates a score for each of the scheduling orderings. A score for a scheduling ordering includes a measure of performance of execution of the set of commands according to the scheduling ordering. The scheduler 113 selects a scheduling ordering from the scheduling orderings based on the calculated scores. The controller 115 issues a command to the memory device according to the scheduling ordering. Further details with regards to the operations of the scheduler 113 are described below.

Figure 2A:
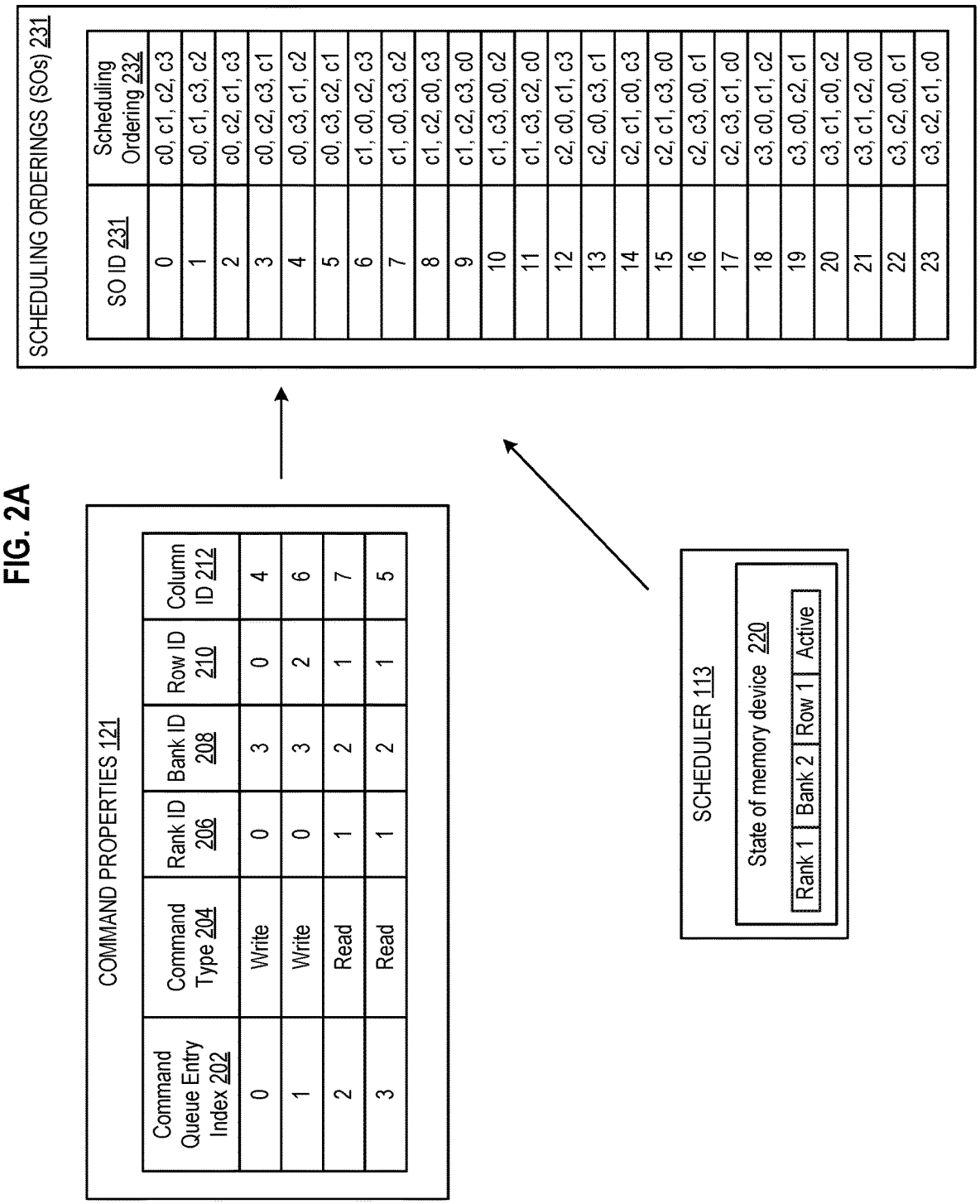
FIG. 2A illustrates a block diagram of an example generation of possible permutations of a set of commands in accordance with some embodiments of the present disclosure.

FIG. 2A illustrates a block diagram of an example generation of possible permutations of a set of commands in accordance with some embodiments of the present disclosure. While the operations of the scheduler 113 are described with reference to the sequence of commands c0, c1, c2, and c3 and command properties 121, this is intended to be a non-limiting example only and other examples of sequences (e.g., a different number of commands, a different set of properties for the commands, etc.) can be processed by the scheduler 113.

The memory subsystem 110 receives from the host system 120 requests for accessing the memory device(s). In some embodiments, the controller 115 breaks down or translates the requests into commands. In some embodiments, the commands are column commands. For example, in response to the receipt of the requests, the controller 115 stores the sequence of commands c0, c1, c2, c3 in a command queue. The commands c0, c1, c2, and c3 are stored according to the order of receipt of their associated requests from the host system 120. The controller 115 stores command properties 121 for the sequence of commands. The command properties 121 include various data about each command. For example, the properties can include a command queue entry index 202 that is indicative of the order of receipt of the command from the host system 120. In the example presented herein, the command properties include indices 0, 1, 2, and 3 for respective commands c0, c1, c2, and c3. The command properties 121 further include a command type 204 that indicates whether the command is a read or a write. The command properties 121 also include an identification of the location in a memory device from/to which data is to be read or written. For example, the identification of the location can include a rank identifier 206 that identifies the rank of the command in the memory device, a bank identifier 208 that identifies the bank of the command in the memory device, a row identifier 210 that identifies the row of the command in the memory device, and a column identifier 212 that identifies the column of the command in the memory device. The controller 115 can store the command properties 121 in a local memory, e.g., local memory 119. The controller 115 is operative to decide, based on the command properties and based on a state of the memory device(s), which command from the sequence of commands c0, c1, c2, c3, to choose next for issuance.

The scheduler 113 determines a set of scheduling orderings 231 for the sequence of commands. This set includes all possible permutations of the sequence of commands. For example, for a sequence of commands with four commands, there are twenty-four possible permutations of scheduling orderings. In some embodiments, the set 231 is stored in local memory 119.

Figure 2B:
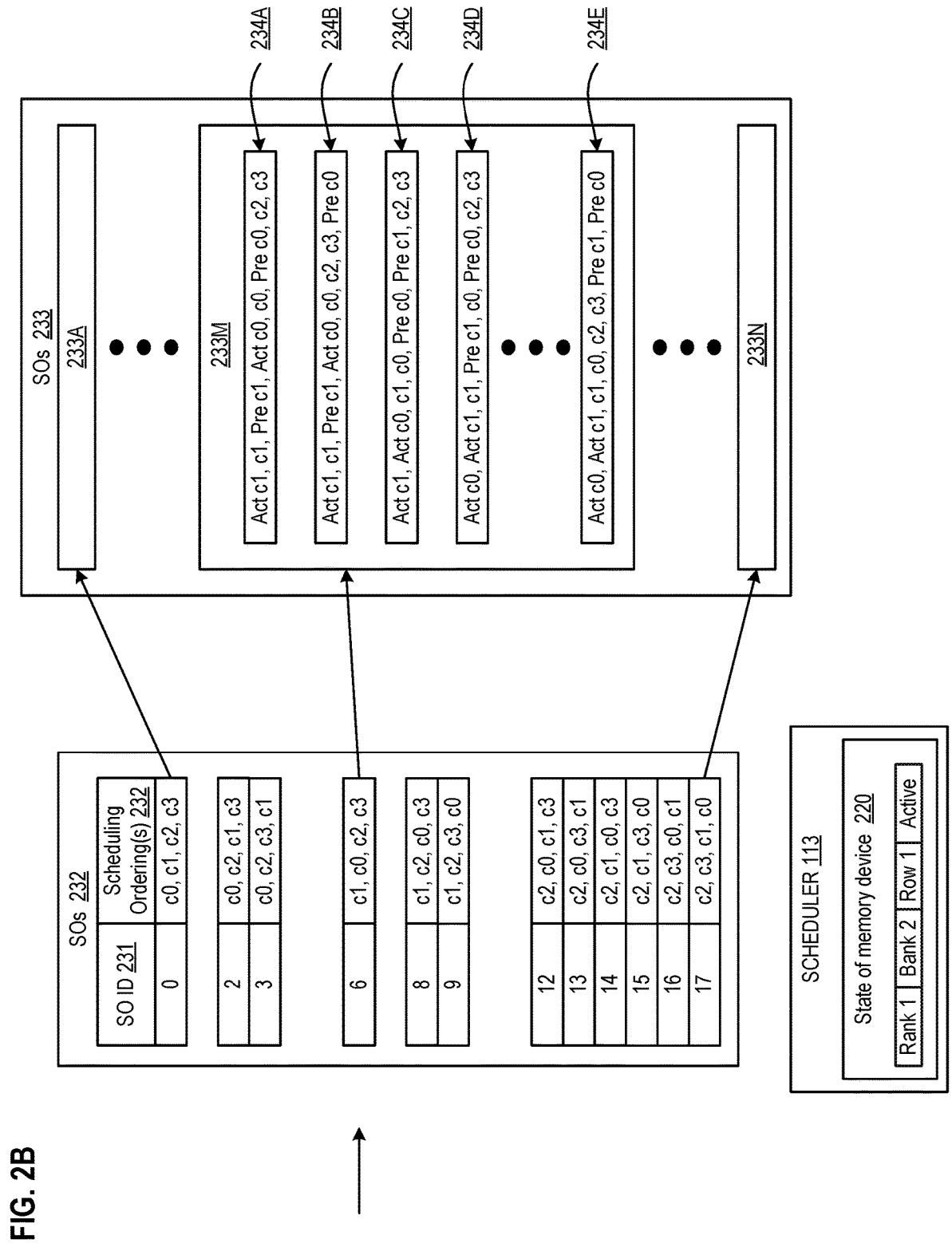
FIG. 2B illustrates a block diagram of an example determination of a subset of all possible permutations of the sequence of commands in accordance with some embodiments of the present disclosure.
Figure 2C:
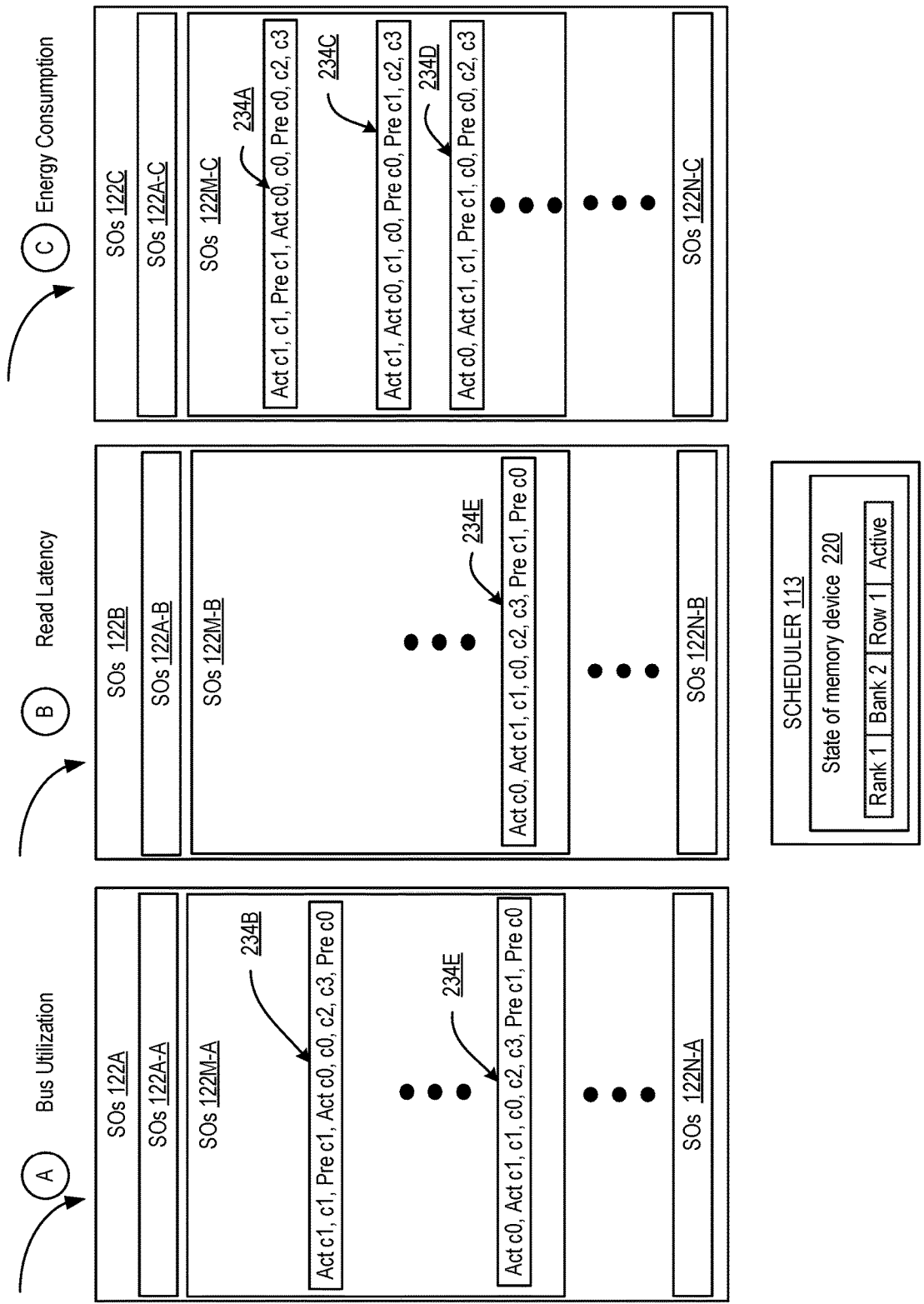
FIG. 2C illustrates a block diagram of an example determination of scheduling orderings for the subset of all possible permutations according to a performance metric in accordance with some embodiments of the present disclosure.

In some embodiments, prior to selecting a scheduling ordering from the set 231, the scheduler is operative to prune the scheduling orderings to reduce the number of scheduling orderings from which the selection is to be performed. FIG. 2B illustrates a block diagram of an example determination of a subset of all possible permutations of the sequence of commands in accordance with some embodiments of the present disclosure. FIG. 2C illustrates a block diagram of an example determination of scheduling orderings for the subset of all possible permutations according to a performance metric in accordance with some embodiments of the present disclosure.

In one embodiment, the scheduler 113 determines a subset 232 of the set of scheduling orderings 231 based on predefined rules. In some embodiments, the predefined rules are independent of performance metrics. For example, the predefined rules can include a rule that commands to a same row are issued in the order of receipt of their associated requests from the host system 120. The predefined rule causes the scheduler 113 to prune any scheduling orderings that issue column commands to the same row out of order. In the illustrated example of FIG. 2A, the commands c2 and c3 are column commands of type "read" and share the same rank, 1, the same bank, 2, and the same row, 1. The request that resulted in the column command c3 was received from the host system 120 after the request that resulted in the column command c2. According to the rule described above, any scheduling ordering (SO) that issues command c3 before c2 can be pruned by the scheduler 113. The scheduler 113 keeps the remaining subset 232 of scheduling orderings from the set 231. FIG. 2B includes the subset 232 that results from the selection performed by the scheduler according to the predefined rule. According to the predefined rule, the following scheduling orderings are removed and no longer considered by the scheduler 113 for subsequent operations: SO with ID 1 (c0, c1, c3, c2), SO with IDs 4-5, SO with ID 7, SO with IDs 10-11, and SO with IDs 18-23. The number of scheduling orderings is reduced from twenty-four to twelve. In some embodiments, to keep a scheduling ordering from the set 231, the scheduler 113 sets a flag to a predetermined value. When the flag of the scheduling ordering is set to the predetermined value (e.g., 1), the scheduler 113 performs subsequent operations using the SO (e.g., calculating a score for the SO and considering that SO when sorting the SO's based on their associated scores). When the flag is cleared (e.g., set to another value that is different from the predetermined value (e.g., 0)), the scheduler 113 will ignore that SO in the subsequent operations.

Reducing the number of SO's that the scheduler is to consider when selecting an SO for the sequence of commands increases the scheduler's efficiency and decreases the processing cost of the memory subsystem for responding to requests from the host system 120. The use of the predefined rule enables the scheduler 113 to quickly remove SO's that are suboptimal. In some embodiments, one or more pruning cores can be added to the architecture of a memory controller 115 for pruning/filtering out such SO's from all possible permutations for the sequence of commands. The pruning cores can be operative to determine whether an SO satisfies one or more predefined rules and set a flag for the SO in the local memory when the SO satisfies the rule(s). A pruning core includes processing logic that can include hardware (e.g., processing device, circuitry, dedicated logic, programmable logic, microcode, hardware of a device, integrated circuit, etc.), software (e.g., instructions run or executed on a processing device), or a combination thereof.

Additionally or alternatively, the scheduler 113 can be operative to add one or more commands to the sequence of commands and consider scheduling orderings for the combined set of commands. In some embodiments, the issuance of one or more of the commands c0, c1, c2, and c3 can cause the issuance of additional commands. For example, to issue a command to a column of a row that is not yet activated, the memory controller 115 needs to issue a command to activate that row before issuing the column command. In these embodiments, when determining an SO for the sequence/set of commands c0, c1, c2, and c3, the scheduler 113 can determine additional row commands that are needed for issuing that SO.

The generation of the row commands is dependent on the order of the commands in the SO. During the scheduling process, a row of a bank may have been activated or inactivated. Further, the memory controller 115 can only issue a column command, e.g., c0, once the row for that column command in its corresponding bank is activated. Thus, when the row for a column is not active, the memory controller 115 needs to issue an activate (Act) command, e.g., Act c0 to activate the row before issuing the column command c0. Activate is a row access command as it opens up a row of a bank. The activate command is paired with inputs to a bank address register (that selects the current bank) and a row address register (that selects the desired row). An active row remains open until a precharge (Pre) command is issued. In contrast, when the row of a command is already active, the memory controller 115 does not need to issue an additional command to activate the row before issuing the column command. In the illustrated example of FIGS. 2A-B, c2 and c3 are column commands in row 1 of bank 2 of rank 1, which is active, as indicated in the state of memory device 220; while column commands c1 and c0 have inactive rows 2 and 0 in bank 3 of rank 0. In some embodiments, when the last command issued by the memory controller 115 was for activating a row, the memory controller issues a Pre command to that row before issuing an activate command to another row of the same bank. When the memory controller's most recent row command is a precharge of a row, the memory controller needs only to issue an activate to another row of the same bank before issuing the column command to this other row. Thus, based on the command properties 121 of c0, c1, c2, and c3 and the state of the memory device 220 (where row 1 in bank 2 of rank 1 is active and other rows are inactive) the scheduler 113 issues additional commands, including Act c0 to activate row 0 in bank 3 of rank 0, Act c1 to activate row 2 in bank 3 of rank 0, a Pre c0 to deactivate row 0 in bank 3 of rank 0, and a Pre c1 to deactivate row 2 in bank 3 of rank 0.

In some embodiments, the state of the memory device 220 includes indications of which rows are active in the memory device. The scheduler 113 generates a set 233 of scheduling orderings from the subset 232. A scheduling ordering of the set 233 includes commands added to the sequence of commands based on the state of the memory device. For example, Act c1, c1, Pre c1, Act c0, c0, pre c0, c2, c3, is a scheduling ordering that includes the additional commands. The generation of the set 233 includes generating the row commands for a scheduling ordering from the subset of SO's 233. In some embodiments, during generation of the set 233, the memory controller 115 further tracks the last row command (e.g., Precharge or Activate) that would be issued to each bank for a sequence of commands and use this information to generate the SOs that include the additional commands (Pre or Act) for that sequence of commands.

In one embodiment, the generation of the set 233 of scheduling ordering includes generating a set of SO's 233A-N for each of the SO's from the subset 232. The operations will be described for SO with ID 6, "c1, c0, c2, c3," however, similar operations are performed for each one of the SO's from the subset 232 resulting in the combined set 233. The generation of this set of SO's, e.g., set 233A, for a given SO from the subset 232, e.g., SO with ID 6, includes: 1) generating a list of commands for each bank from the banks associated with the commands in the SO, where the list of commands includes column commands and row commands, where the column commands are the column commands to the bank in the order that they appear in SO and the row commands are the ones needed to issue the column commands to that bank in that order, and 2) generating based on the additional commands for the banks, permutations of the SO's that respect the order of the commands in the SO with ID 6. For example, the scheduler 113 generates for SO with ID 6, Act c1, Act c0, Pre c0, and Pre c1 for this SO, and generates the permutations 233M that include possible permutations of the combined set of commands {Act c1, Act c0, Pre c0, Pre c1, c0, c1, c2, and c3}, where all of the permutations in the set 233M respect the order of the column commands identified in the SO with ID, i.e., c1, c0, c2, c3. In other words, in all of the SO's of 233M, c1 is issued before c0, c0 is issued before c2, and c2 is issued before c3.

In one embodiment, to generate the set 233M, the scheduler traverses the column commands as ordered in the SO with ID 6. For each column command (c1, c0, c2, or c3), the scheduler 113 examines the row and bank accessed by the column command and the last row command tracked for that bank. When there is no row command to the bank of the column command in the sequence of commands that precedes the column command, the last row command is the last row command issued by the controller to the memory device for that bank. When there is a row command to the bank of the column command in the sequence of commands that precedes the column command, the last row command is a row command that would be issued by the controller when the sequence of commands is issued. The last row of command for a bank and a sequence of command is tracked by the scheduler 113. When the last row command is an activate for the row of the column command, that is an indication that the row for that column command is active (and/or would be activated by a command that precedes the column command) and the scheduler 113 does not need to add a row command for this command. When the last row command to the bank of the column command is a precharge, that is an indication that the row for that column command is/would be inactive and the scheduler 113 generates an activate command for the row in that bank. When the last row command in that bank was an activate for a row other than the row of the column command, that is an indication that a different row is activated in the bank of the column command, and this row is to be deactivated before activating the row of the column command. In this case, the scheduler 113 generates a precharge command for the other row and an activate row command for the column command.

Once the additional commands are identified for an SO, the scheduler 113 generates valid permutations of the combined set of commands for an SO from the SO's 232. In some embodiments, a valid permutation includes a sequence of commands (row and column commands) that satisfy a row activation rule for a bank of the memory device. The row activation rule can include activating a row in a bank before accessing the column in that row. In one embodiment, the row activation rule includes deactivating a row of the bank before activating another row of the bank. In some embodiments, a valid permutation of the combined set of commands for an SO from the SO's 232 is a sequence of the combined commands, where the column commands satisfy the order presented in the SO. For example, "Act c1, Act c0, c1, c0, Pre c0, Pre c1, c2, c3" 235C is a permutation that satisfies the order of the SO with ID 6, "c1, c0, c2, c3," while "Act c1, Act c0, c0, c1, Pre c0, Pre c1, c2, c3" is a permutation that does not satisfy that order and is not included in the subset 233M.

In some embodiments, when the set 233 is generated, the scheduler 113 can further reduce the number of SO's based on one or more rules that are dependent on one or more performance metrics. In some embodiments, the rules are dependent on one or more of: a bus bandwidth metric, a read latency metric, and/or an energy consumption minimization. In one embodiment, the rules are defined to discard any SO that would degrade the performance of the memory subsystem when executing the commands according to that SO in terms of the identified performance metric. FIG. 2C illustrates a block diagram of an example determination of a subset of commands according to a performance metric in accordance with some embodiments of the present disclosure. FIG. 2C illustrates three different scenarios, A, B, and C, of SO sets 122A, 122B, or 122C that the scheduler 113 generated from the subset 233M for reducing the number of SO's to consider in the subsequent operations. The scheduler 113 determines subset 122A, subset 122B, and subset 122C from the set 233M according to different performance metrics. While the determination of the subset is described with respect to the SO's 233M, similar operations are performed for each of the subsets 233A-N from the set 233 to generate the SO's, i.e., subset 122A, subset 122B, or subset 122C, that the scheduler 113 is to score.

In scenario A, the scheduler 113 selects SO's to optimize for bus utilization. In scenario A, the scheduler 113 determines that it is optimal in terms of bus utilization to cycle the rows (i.e., issue Act, column command, and Pre) for both c1 and c0 while interleaving the column commands c2 and c3 within those row cycles. The scheduler 113 can make this determination by selecting SO's from the SO's 233M that satisfy the following rule: the SO causes the controller 115 to issue at least one column command of an active row between an activate and a precharge of an inactive row. For example, the scheduler 113 considers SO's from SO's 233M as optimal in terms of bus utilization when the SO causes the controller 115 to issue c2 between the activate and precharge for either c0 or c1, and to issue c3 between the activate and precharge for either c0 or c1. If the SO does not satisfy this rule, the scheduler 113 discards it. The rule causes the controller 115 to take advantage of the idle time between the Act c1, c1, PRE c1 subsequence of commands and the Act c0, c0, Pre c0 subsequence of commands by interleaving the commands c2 and c3 in these cycles. If the controller 115 does not issue c2 and c3 during one of these subsequences, it is a wasted opportunity to utilize the data bus between the memory controller and the memory device. Hence, such a sequence is not optimal in terms of bus utilization and is discarded by the scheduler 113. In the example of scenario A, the rule causes the scheduler 113 to discard SO's 234A, 234C, and 234D and keep SO's 234B and 234E. While the SO's 233M include a set of five SO's 234A-E, this set can include additional SO's, which are not illustrated. While the SO's 122A include a set of two SO's 234B and 234B that are selected by the scheduler 113, additional SO's can be kept by the scheduler 113.

In scenario B, the rules of SO selection are dependent on a read latency metric. In scenario B, the scheduler 113 determines that it is optimal in terms of read latency to minimize the time elapsed between the moment the controller 115 receives a read request and the moment the controller 115 sends back a response for that request. In some embodiments, to optimize the scheduling for read latency, the controller records the time at which a read request is received by the controller and the scheduler tracks for the command associated with the read request an estimated duration of time between the recorded time of receipt of the request and an estimated time of receipt of a response to the command from the memory device when the command is issued according to an SO. The scheduler 113 1) discards any sequence from the set 233M that contains a read command for a request that has an estimated duration of time that exceeds a determined threshold and 2) keeps SO's where the estimated duration of time does not exceed the threshold. The scheduler 113 calculates the estimated duration of time for a command based on a time needed to issue the read command of an SO, and how long it will take for the read data to be received from the memory device for that command. The time needed to issue the read command according to an SO is dependent on the minimum separation time between commands (e.g., tRRD, tRCD, etc.). In scenario B, the scheduler can estimate the duration of time for the read commands c2 and c3. In one embodiment, the scheduler 113 can determine for each SO from the set 233M, an estimated duration of time for the read command c2, and an estimated duration of time for the read command c3, based on the order of these commands in the SO. The scheduler 113 discards any SO from the set 233M when the estimated duration of time of any of the commands c2 and c3 is greater than the predetermined threshold. In one non-limiting example, the scheduler 113 may keep the SO 234E and discard 234A-D. Additional SO's from the set 233M can be kept based on the estimated read latency of c2 and c3.

In scenario C, the rules are dependent on an energy consumption metric. In scenario C, the scheduler 113 determines that it is optimal in terms of energy consumption to deactivate a row as soon as all commands have been issued for that row. The scheduler 113 can reduce energy consumption of the memory subsystem by selecting SO's that deactivate rows as early as possible. Following this rule can be used in a low-performance mobile system. Considering the previous example, the scheduler 113 discards SO's 234B and 234E, and keeps SO's 234A and 234C-D. While embodiments herein have been described with a scheduler selecting the subset of SO's 122A, 122B, or 122C, based on a single performance metric, e.g., bus utilization, read latency, or energy consumption, in other embodiments, the scheduler 113 can select the subset of SO's based on multiple performance metrics.

Figure 2D:
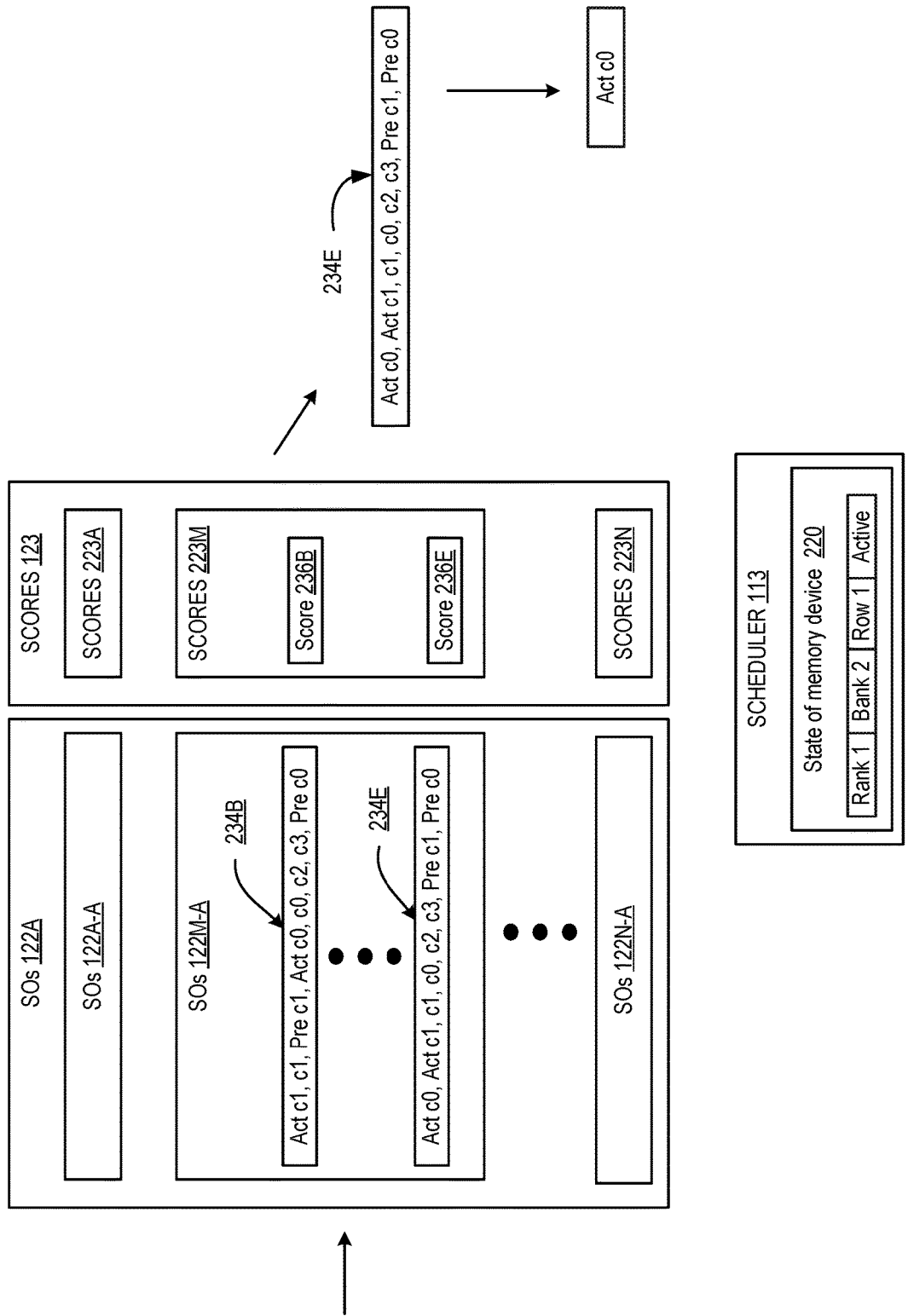
FIG. 2D illustrates a block diagram of an example selection of a scheduling ordering in accordance with some embodiments of the present disclosure.

When the scheduler 133 has selected the subset of SO's 122A, 122B, or 122C, the scheduler calculates a score for each of the scheduling orderings from the subset and selects based on the scores a selected SO for issuing the commands to the memory device. FIG. 2D illustrates a block diagram of an example selection of a scheduling ordering based on the scores in accordance with some embodiments of the present disclosure. The embodiments of FIG. 2D will be described with reference to the SO's 122A, however this is intended to be exemplary only, and similar operations can be performed for other sets, such as 122B-C, 233, or 231. The scheduler 113 determines a score for each of the SO's 122A. A score for a scheduling ordering includes a measure of performance of execution of the set of commands according to the scheduling ordering. In some embodiments, one or more scheduling cores can be added to the architecture of a memory controller 115 for calculating scores. A scheduling core includes processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, each of the scheduling cores is assigned a SO. The scheduler core is operative to calculate the score for the assigned SO and store the score for that SO in memory, e.g., local memory 119 of the memory controller.

In one embodiment, the score for a scheduling ordering can include an estimate of the time needed to retrieve all data for all commands in the sequence of commands (e.g., for c0, c1, c2, and c3). In some embodiments, the estimate of the time is based on a minimum time needed between the commands of a sequence. For example, the scheduler 113 calculates the time needed to retrieve all data by summing the minimum time separation of all of the commands until the last column command is issued and adding to that sum the time that it will take for the data bus to go idle for that column command. The controller can determine the minimum time needed between two commands of a sequence (also referred to as minimum time separation) as a function of timing parameters (such as row to row delay (tRRD), RAS to CAS Delay (tRCD), etc.) that are known to the controller for a given type of memory device. The time for the data bus to go idle is a fixed time specified by the memory device. The time for the data bus to go idle is based on CL/CWL (the time between when the command is issued and when the data bus starts for a read or a write command respectively), the data transfer size for the command, the data bus width, and the rate of data transfer across the bus. A decrease of a time needed to retrieve all the data is indicative of an improvement in bandwidth and consequently an improvement in terms of bus utilization metric. When the scheduler 113 is operative to select the SO according to a bus utilization metric, the scheduler 113 selects the SO with the lowest score (i.e., with the shorter time needed to access the data for all commands of the sequence). In one example, the scheduler 113 selects a scheduling ordering 234E from the scheduling orderings 122A based on the calculated scores.

In another example, the scheduler 113 is operative to select the SO that scores best in terms of another metric, such as read latency (i.e., the time between when a read request arrives and when the controller 115 sends its response for that read request). The controller records for each read request received from the host system, the time of receipt of this request and associates this time with the read command for the request. The scheduler 113 determines the average read latency for each SO and selects the SO with the lowest read latency. The scheduler 113 determines the estimated duration of time for each read command according to an SO. The controller can estimate the duration of time based at least in part on the minimum time separation between two commands (e.g., tRRD, tRCD, etc.). The scheduler 113 determines the average read latency for an SO by summing the duration times of all the read requests in a sequence divided by the number of these read requests. In some embodiments, when determining the average read latency, the scheduler 113 considers read latencies of all read commands in the controller, not just read latencies to a particular bank. Alternatively or additionally, the scheduler can consider a maximum read latency. The scheduler determines the maximum read latency for an SO as the maximum duration time from the duration times of all the read requests according to that SO. In some embodiments, the scheduler 113 can select an SO from the SO's when the maximum read latency and/or the average read latency satisfy a threshold. In some embodiments, the scheduler can select an SO when the average read latency is less than all the average read latencies than the other SO's. In some embodiments, the scheduler can select an SO when the maximum read latency is less than all maxima read latencies of the other SO's. In some embodiments, the scheduler can select an SO when the average read latency is less than all the average read latencies than the other SO's and the maximum read latency is less than a predetermined threshold. In some embodiments, the scheduler 113 can select an SO with a worse average read latency over one that fails to meet the maximum read latency threshold. The scheduler 113 can enforce such a requirement by discarding any SO's whose maximum read latency exceeds the threshold.

In some embodiments, one or more sorter cores can be added to the architecture of a memory controller 115 for sorting the SO's according to the scores and selecting an SO based on the sorted scores. A sorter core includes processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the sorter cores sort the determined SO's. When the sorting is complete, the memory controller can select a first command from the highest scored SO for issuance.

Upon selection of the SO 234E, the memory controller 115 issues a command to the memory device according to the scheduling ordering. In some embodiments, the command is from the set of commands generated in response to requests from the host system. Alternatively, the command can be a row command generated by the memory controller 115 for a command from the set of commands based on the state of the memory device. For example, the memory controller 115 issues the command Act c0 to the memory device, followed with Act c1, and command c1, etc. When issuing a command, the memory controller 115 is further operative to keep track of a latest row command for a bank (e.g., Act c0, Act c1, Pre c1, Pre c0) and update a state of the memory device.

Figure 3A:
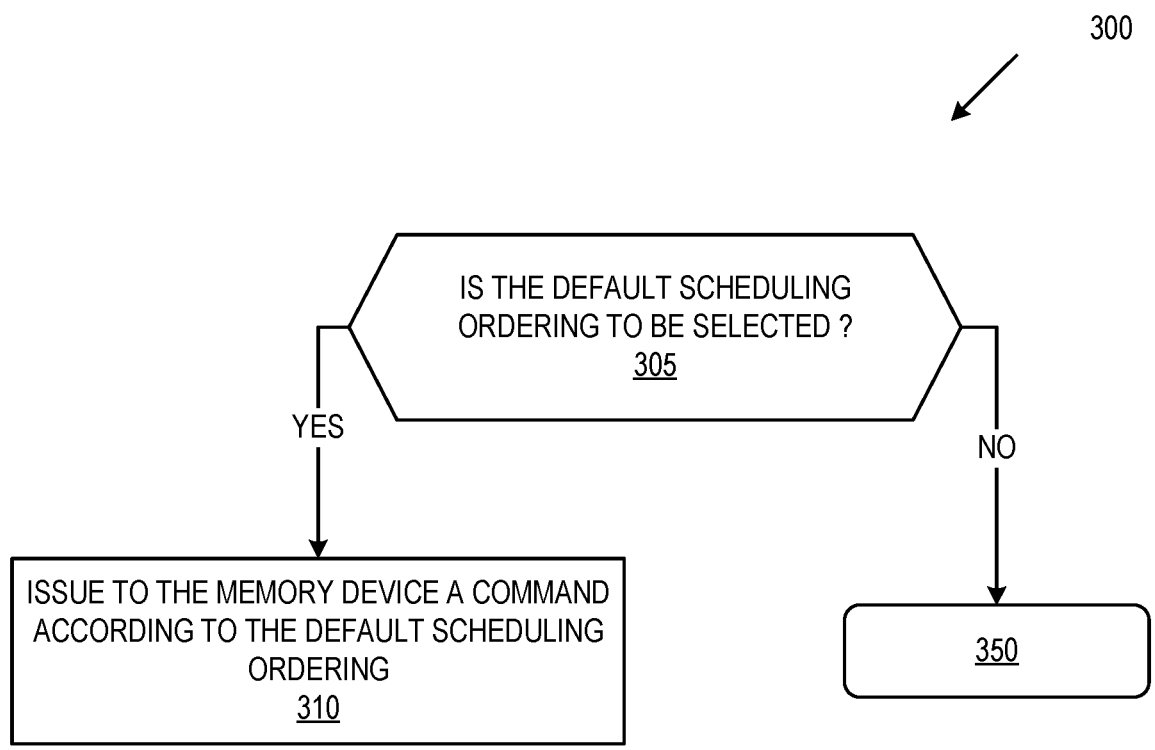
FIG. 3A is a flow diagram of an example method 300 to schedule commands in a memory device in accordance with some embodiments of the present disclosure.
Figure 3B:
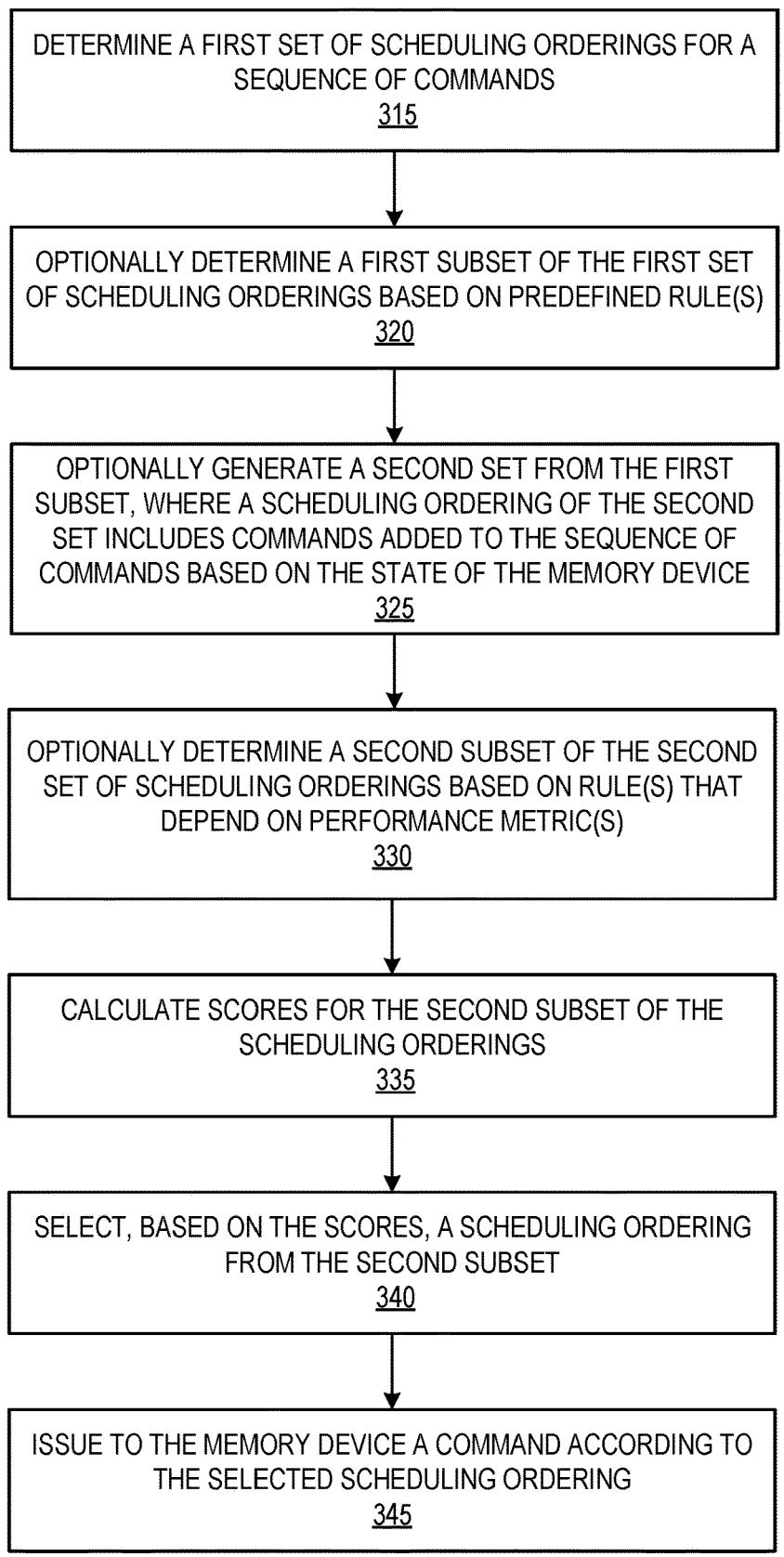
FIG. 3B is a flow diagram of an example method 350 to schedule commands according to a selected SO in accordance with some embodiments of the present disclosure.

FIGS. 3A-B are flow diagrams of example methods 300 and 350 to schedule commands in a memory device in accordance with some embodiments of the present disclosure. The methods 300 and 350 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 300 and 350 are performed by the controller 115 of FIG. 1. In some embodiments, some or all operations of the methods 300 and 350 are performed by the scheduler 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In some embodiments, the memory controller 115 performs these operations when a new request arrives from the host system 120. Additionally or alternatively, the memory controller 115 can perform these operations when a command is issued to the memory device. The methods 300 and 350 can be repeated each time a new request arrives from the host and/or a command is issued to the memory device.

In some embodiments, the memory controller 115 can operate in one of two modes, a mode of operation where a default ordering is always used and another mode of operation where the selection of the scheduling ordering is performed based on scores. The mode of operation of the memory controller 115 can be set during an initial configuration operation of the memory subsystem. The default scheduling ordering is an SO that can be used by the memory controller 115 for scheduling commands of a sequence regardless of scores. The default scheduling ordering satisfies one or more rules for execution of the set of commands that are independent of a score for the default scheduling ordering. For example, the default scheduling ordering can be FR FCFS (first-ready, first-come, first-serve), which depends on simple rules and policies for issuing commands. In other embodiments, the memory controller 115 can operate in single mode of operations where the selection of the scheduling ordering is performed based at least in part on scores and the operations of the method 350 are performed without the operations 305 and 310 of the method 300.

At operation 305, the processing device determines whether the default scheduling ordering is to be selected regardless of the scores of the SO's. In some embodiments, determining whether to select the default scheduling ordering can be based on a mode of operation set for the memory controller 115. When the controller 115 is set to operate in the mode of operation where the default ordering is always used, the flow of operations moves to operation 310. Alternatively, when the controller 115 is set to operate in the mode of operations where the selection of the SO is performed based on scores, the flow of operations moves to operations 350.

At operation 310, the processing device issues to the memory device a command according to the default scheduling ordering. For example, the processing device can issue the commands according to FR FCFS. In some embodiments, the command is from the set of commands generated in response to requests from the host system. Alternatively, the command can be a row command generated by the memory controller 115 for a command from the set of commands based on the state of the memory device.

FIG. 3B is a flow diagram of an example method 350 to schedule commands according to a selected SO in accordance with some embodiments of the present disclosure. At operation 315, the processing device determines a set 231 of scheduling orderings for a sequence of commands, e.g., sequence c0, c1, c2, and c3. In some embodiments, the sequence of commands includes column commands stored in a command queue of the memory controller 115 in response to receipt of corresponding requests from the host system 120. In some embodiments, the processing device stores command properties 121 for the commands. The set 231 includes all possible permutations of commands for the sequence of commands c0, c1, c2, and c3. The processing device determines the set 231 as described above.

At operation 320, the processing device determines a subset 232 of all possible permutations of commands for the sequence of commands (e.g., the set 231) based on pre-defined rules. In some embodiments, the predefined rules are independent of a performance metric. In some embodiments, the processing device can determine the subset 232 as described above. Operation 320 is optional and can be skipped in some embodiments.

At operation 325, the processing device generates a set 233 of scheduling orderings from the subset 232 of all the possible permutations. A scheduling ordering, e.g., 234A, of the set 233 includes commands added to the sequence of commands based on the state of the memory device 220. The additional commands can include one or more commands for activating or deactivating rows for one or more column commands from the sequence of commands. The processing device generates the set 233 based on a state of the memory device. In some embodiments, the processing device generates for a command from the subset 232 an additional command based on a last row command tracked for the command's bank. In some embodiments, the processing device can generate the set 233 as described above. In some embodiments, when operation 320 is performed, operation 325 is performed on the subset 232. Alternatively, when operation 320 is skipped, operation 325 is performed on the set 231 of scheduling orderings instead of being performed on a subset of this set. While in some embodiments, the processing device generates a set 233 that is different from the subset 232, by generating the additional commands and generating permutations of the combined set of commands, in other embodiments, the processing device generates a set 233 that is identical to the subset 232 as no additional commands are needed (e.g., all accessed rows are activated).

At operation 330, the processing device determines a subset, e.g., subset 122A, of the set 233 of scheduling orderings based on one or more rules that are dependent on one or multiple performance metrics. In some embodiments, the rules are dependent on a bus bandwidth metric, a read latency metric, and/or an energy consumption metric. For example, the predefined rules can include a rule that commands to a same row of a bank are issued in the order of receipt of their associated requests from the host system 120. The predefined rule causes the scheduler 113 to prune any scheduling orderings that would issue column commands to the same row of a bank out of order from the order of receipt of the requests. In some embodiments, the processing device determines a subset, e.g., 122A, of the set 233 as described above.

At operation 335, the processing device calculates scores for the subset of the scheduling orderings, e.g., SO's 122A. The subset 122A is associated with a set of commands, e.g., commands c0, c1, c2, c3. A score for a scheduling ordering includes a measure of performance of execution of the set of commands according to the scheduling ordering. In one embodiment, the score for a scheduling ordering can include an estimate of the time needed to retrieve all data for all commands in the sequence of commands (e.g., for c0, c1, c2, and c3). In some embodiments, the processing device calculates a score for the default scheduling ordering. In some embodiments, the default scheduling ordering can be part of the subset of scheduling orderings, i.e., the default scheduling ordering may have been selected by the scheduler 113 during the operations 315-220. In other embodiments, the default scheduling ordering may not be included in the subset of SO's, as it may not have been selected by the scheduler 113 during those operations.

At operation 340, the processing device selects, based on the scores, a scheduling ordering from the subset of the scheduling orderings. In one embodiment, the selection of the scheduling ordering includes determining a score from the multiple scores that satisfies a performance criterion for the memory subsystem. The performance criterion includes one of (alone or in combination) a read latency criterion, a bus bandwidth criterion, and power consumption criterion. The read latency is a latency of the memory subsystem for sending a response to a request received from the host system 120. The bus bandwidth relates to the bandwidth of the bus that connects the memory controller with the memory device. The power consumption relates to the power (or energy) consumption of the memory device.

When the scheduler 113 is operative to select the SO according to a bus utilization metric, the scheduler 113 selects the SO with the lowest score (i.e., with the shorter time needed to access the data for all commands of the sequence). Additionally or alternatively, the scheduler 113 is operative to select the SO that scores best in terms of a read latency. The score for a read latency can be indicative of a time between when a read request is received from a host system and an estimate of when the controller 115 sends its response for that read request. In some embodiments, the scheduler 113 can select an SO based on an average read latency of the SO's. Alternatively or additionally, the scheduler 113 can select the SO based on a maximum read latency. In some embodiments, the scheduler can select an SO when the average read latency is less than all the average read latencies of the other SO's. In some embodiments, the scheduler 113 can select an SO from the SO's when the maximum read latency satisfies a threshold. In some embodiments, the scheduler can select an SO when the maximum read latency is less than all maxima read latencies of the other SO's. In some embodiments, the scheduler can select an SO when the average read latency is less than all the average read latencies of the other SO's and the maximum read latency is less than a predetermined threshold. In some embodiments, the scheduler 113 can select an SO with a worst average read latency over one that fails to meet the maximum read latency threshold. The scheduler 113 can enforce such a requirement by discarding any SO's whose maximum read latency exceeds the threshold and selecting the SO from the remaining SO's based on their average read latencies.

At operation 345, the processing device issues to the memory device a command according to the selected scheduling ordering. In some embodiments, the command is from the set of commands generated in response to requests from the host system. Alternatively, the command can be a row command generated by the memory controller 115 for a command from the set of commands based on the state of the memory device. In some embodiments, issuing the command is performed as described above. In some embodiments, when issuing a command, the processing device updates a state of the memory device. Additionally or alternatively, when issuing a command the processing device keeps track of a latest row command for a bank.

In some embodiments, the processing device can determine whether the default scheduling ordering is to be selected based on an interval of time satisfying a threshold while performing one or more of the operations 315-340. In some embodiments, the processing device can track an interval of time for determining the scores for multiple SO's. For example, the processing device can start a timer when the processing device starts performing operation 315. When the timer exceeds a time threshold (i.e., determination of the SO's based on the scores is taking a long period of time), the processing device determines that the default scheduling ordering is to be selected. Alternatively, when the timer does not exceed a time threshold (i.e., the selection of an SO based on the scores can be performed within the time threshold), the processing device continues to perform the operations 315-340, until a SO is selected (operation 340) or the time interval exceeds the time threshold.

When the processing device determines that the default scheduling ordering is to be selected, the operations move to operation 310 of FIG. 3A (the connection between operations 340 and 310 is not illustrated). Alternatively, when the processing device determines that the default scheduling ordering is not to be selected, the operations move to operation 345. In some embodiments, once an SO is selected (e.g., based on scores or the default SO), the processing device continues to issue commands based on the selected SO until a new request is received from the host system. Additionally or alternatively, the processing device can repeat some or all the operations of method 350 each time a command is issued to the memory device.

FIG. 4 is a flow diagram of another example method 400 to schedule commands in a memory subsystem according to a selected scheduling ordering in accordance with some embodiments of the present disclosure.

At operation 405, the processing device determines scheduling orderings for a set of commands A scheduling ordering from the SO's identifies an order by which a memory subsystem controller, e.g., memory controller 115, is to issue each command in the set of commands to a memory device, e.g., memory device 140. The set of commands is determined in response to requests received from a host system, e.g., host system 120. In some embodiments, determining the scheduling orderings is performed at least in part according to properties of the set of commands Determining the scheduling orderings can be based on a subset of all possible permutations of the commands. For example, the processing device calculates scores for the SO's 122A, 122B, or 122C. The subset of all possible permutations can be determined based on one or more rules that are dependent and/or independent from one or a combination of performance metrics. The performance metrics can include a read latency metric, a bus utilization metric, and/or a power consumption metric. In some embodiments, the scheduling orderings can be based on all possible permutations of commands for the set of commands. In some embodiments, determining the scheduling orderings for the set of commands is in response to the processing device receiving a new request from the host system or in response to the processing device issuing a command to the memory device. In some embodiments, determining the scheduling ordering is performed as described above.

At operation 410, the processing device calculates scores for multiple scheduling orderings of a set of command. In some embodiments, calculating the scores is based on a current state of memory device, e.g., state 220, and command properties of the set of commands, e.g., command properties 121. In some embodiments, calculating the scores is performed as described above.

At operation 415, the processing device selects, based on the scores, a scheduling ordering from the scheduling orderings. In some embodiments, selecting a scheduling ordering includes determining a score from the scores that satisfies a performance criterion for a memory subsystem that includes the memory device. The performance criterion includes one or a combination of a read latency criterion, a bus bandwidth criterion, and power consumption criterion. In some embodiments, selecting a scheduling ordering is performed as described above.

At operation 420, the processing device issues to the memory device a command according to the selected scheduling ordering. In some embodiments, the command is from the set of commands generated in response to requests from the host system. Alternatively, the command can be a row command generated by the memory controller 115 for a command from the set of commands based on the state of the memory device. In some embodiments, issuing a command to the memory device is performed as described above.

Figure 5:
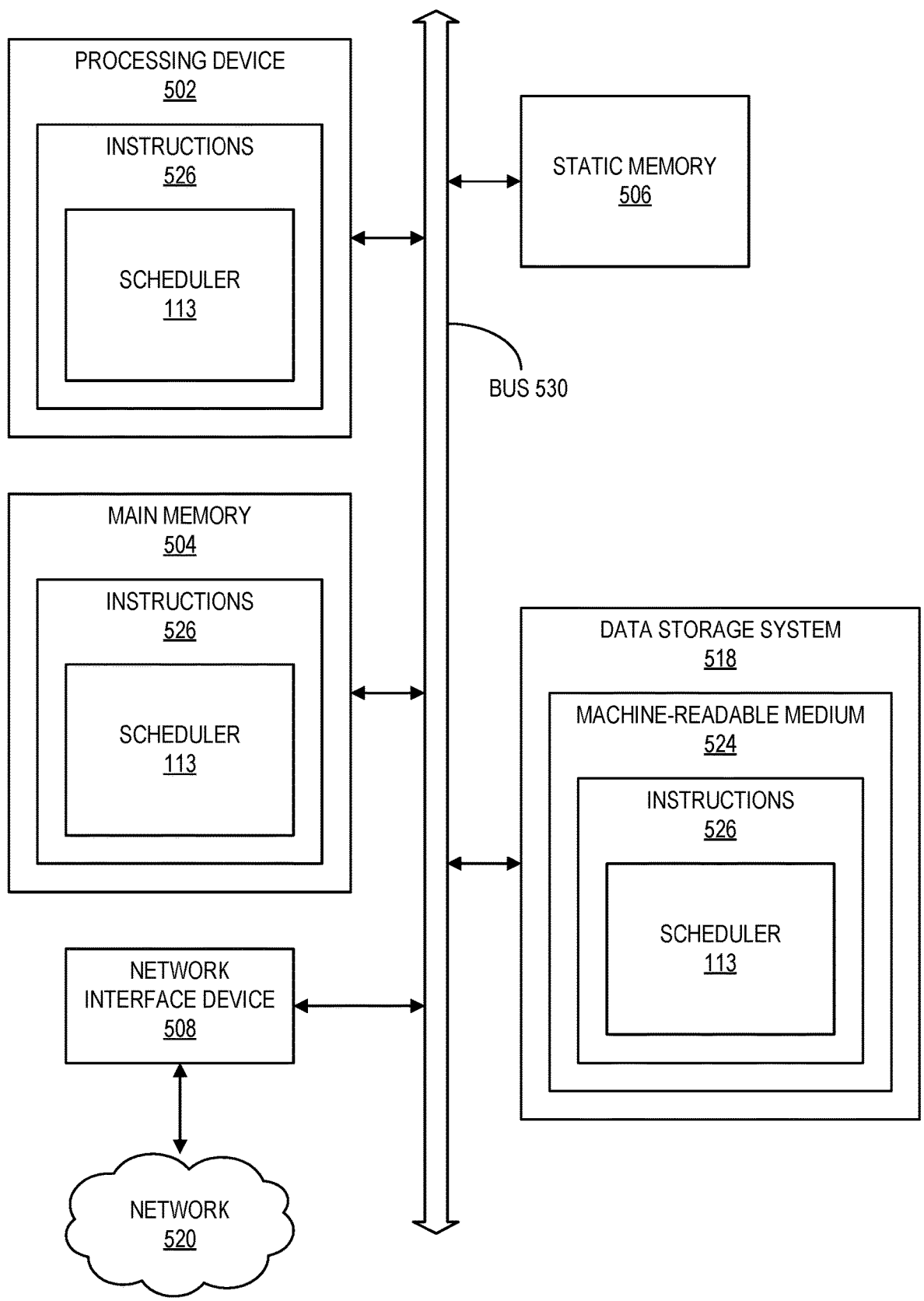
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the scheduler 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory subsystem 110 of FIG. 1.

In one embodiment, the instructions 526 include instructions to implement functionality corresponding to a scheduler (e.g., the scheduler 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 300, 350, and 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining a plurality of scheduling orderings for a set of commands, wherein a scheduling ordering identifies an order by which a memory subsystem controller is to issue each command in the set of commands to a memory device;
   generating a subset of the plurality of scheduling orderings by discarding a scheduling ordering of the plurality of scheduling orderings using a rule that is dependent on a performance metric;
   calculating a plurality of scores for each of the scheduling orderings of the subset, wherein a score of the plurality of scores includes a measure of performance of execution of the set of commands according to the scheduling ordering;
   selecting, based on the plurality of scores, a scheduling ordering from the subset; and
   issuing to the memory device a command according to the scheduling ordering.

2. The method of claim 1, wherein the selecting the scheduling ordering from the subset includes:
   determining a score from the plurality of scores that satisfies a performance criterion for a memory subsystem that includes the memory device.

3. The method of claim 2, wherein the performance criterion includes one or a combination of a read latency criterion, a bus bandwidth criterion, and power consumption criterion.

4. The method of claim 1, wherein the calculating the plurality of scores is based on a current state of the memory device and command properties of the set of commands.

5. The method of claim 1, wherein the plurality of scheduling orderings includes a default scheduling ordering that satisfies one or more rules for execution of the set of commands that are independent of a score for the default scheduling ordering, and the method further comprises:
   selecting, based on an interval of time elapsed since the start of the determination of the plurality of scheduling orderings, the default scheduling ordering from the plurality of scheduling orderings regardless of the plurality of scores.

6. The method of claim 1, wherein the determining the plurality of scheduling orderings for the set of commands is in response to the memory subsystem controller receiving a new request from a host system or the memory subsystem controller issuing a command to the memory device.

7. The method of claim 1, wherein the determining the plurality of scheduling orderings is based on a subset of all possible permutations of a sequence of commands for the set of commands that is selected according to properties of the set of commands.

8. A non-transitory computer-readable storage medium comprising instructions that, when executed by a processing device, cause the processing device to:
   determine a plurality of scheduling orderings for a set of commands, wherein a scheduling ordering identifies an order by which a memory subsystem controller is to issue each command in the set of commands to a memory device;
   generate a subset of the plurality of scheduling orderings by discarding a scheduling ordering of the plurality of scheduling orderings using a rule that is dependent on a performance metric;
   calculate a plurality of scores for each of the scheduling orderings of the subset wherein a score of the plurality of scores includes a measure of performance of execution of the set of commands according to the scheduling ordering;
   select, based on the plurality of scores, a scheduling ordering from the subset; and
   issue to the memory device a command according to the scheduling ordering.

9. The non-transitory computer-readable storage medium of claim 8, wherein to select the scheduling ordering from the subset includes to:
   determine a score from the plurality of scores that satisfies a performance criterion for a memory subsystem that includes the memory device.

10. The non-transitory computer-readable storage medium of claim 9, wherein the performance criterion includes one or a combination of a read latency criterion, a bus bandwidth criterion, and power consumption criterion.

11. The non-transitory computer-readable storage medium of claim 8, wherein to calculate the plurality of scores is based on a current state of the memory device and command properties of the set of commands.

12. The non-transitory computer-readable storage medium of claim 8, wherein the plurality of scheduling orderings includes a default scheduling ordering that satisfies one or more rules for execution of the set of commands that are independent of a score for the default scheduling ordering, and wherein the processing device is further to:
   select, based on an interval of time elapsed since the start of the determination of the plurality of scheduling orderings, the default scheduling ordering from the plurality of scheduling orderings regardless of the plurality of scores.

13. The non-transitory computer-readable storage medium of claim 8, wherein to determine the plurality of scheduling orderings for the set of commands is in response to the memory subsystem controller receiving a new request from a host system or the memory subsystem controller issuing a command to the memory device.

14. The non-transitory computer-readable storage medium of claim 8, wherein to determine the plurality of scheduling orderings is based on a subset of all possible permutations of a sequence of commands for the set of commands that is selected according to properties of the set of commands.

15. A system comprising:
   a plurality of memory devices; and
   a processing device, operatively coupled with the plurality of memory devices, to:

determine a plurality of scheduling orderings for a set of commands, wherein a scheduling ordering identifies an order by which a memory subsystem controller is to issue each command in the set of commands to a memory device, generate a subset of the plurality of scheduling orderings by discarding a scheduling ordering of the plurality of scheduling orderings using a rule that is dependent on a performance metric, calculate, based on a current state of the memory device and command properties of the set of commands, a plurality of scores for each of the scheduling orderings of the subset, wherein a score of the plurality of scores includes a measure of performance of execution of the set of commands according to the scheduling ordering, select, based on the plurality of scores, a scheduling ordering from the subset, and issue to the memory device a command according to the scheduling ordering.

16. The system of claim 15, wherein to select the scheduling ordering from the scheduling subset to:

determine a score from the plurality of scores that satisfies a performance criterion for a memory subsystem that includes the memory device.

17. The system of claim 16, wherein the performance criterion includes one or a combination of a read latency criterion, a bus bandwidth criterion, and power consumption criterion.

18. The system of claim 15, wherein the plurality of scheduling orderings includes a default scheduling ordering that satisfies one or more rules for execution of the set of commands that are independent of a score for the default scheduling ordering, and wherein the processing device is further to:

select, based on an interval of time elapsed since the start of the determination of the plurality of scheduling orderings, the default scheduling ordering from the plurality of scheduling orderings regardless of the plurality of scores.

19. The system of claim 15, wherein to determine the plurality of scheduling orderings for the set of commands is in response to the memory subsystem controller receiving a new request from a host system or the memory subsystem controller issuing a command to the memory device.

20. The system of claim 15, wherein to determine the plurality of scheduling orderings is based on a subset of all possible permutations of a sequence of commands for the set of commands that is selected according to properties of the set of commands.

* * * * *